United States Patent [19]

Jacobson et al.

[11] Patent Number: 4,957,532
[45] Date of Patent: Sep. 18, 1990

[54] GLASS-TREATING FURNACE WITH ROLLER CONVEYOR

[75] Inventors: David Jacobson, Pomona, N.Y.; Robert LeGrand, Fairlawn, N.J.; Keith Gardener, Spring Valley, N.Y.

[73] Assignee: Casso-Solar Corporation, Pomona, N.Y.

[21] Appl. No.: 369,693

[22] Filed: Jun. 20, 1989

[51] Int. Cl.$^5$ ............................................. C03B 35/18
[52] U.S. Cl. ...................................... 65/273; 65/349; 198/789
[58] Field of Search ............... 65/104, 106, 273, 291, 65/107, 351, 348, 118, 349; 198/789, 790

[56] References Cited

U.S. PATENT DOCUMENTS

| | | | |
|---|---|---|---|
| 4,528,016 | 7/1985 | Canfield | 65/162 X |
| 4,725,300 | 2/1988 | McMaster | 65/348 X |
| 4,816,055 | 3/1989 | Reunamäki et al. | 65/273 X |

Primary Examiner—Joye L. Woodard
Attorney, Agent, or Firm—Herbert Dubno

[57] ABSTRACT

A furnace for the heat treating of glass, has a housing defining an elongated furnace chamber having opposite longitudinal sides and having an inlet end and an outlet end. A roller conveyor extends between the inlet end and the outlet end. The roller conveyor has a respective row of stub rollers spaced apart along each longitudinal side of the chamber, and respective conveyor rollers spanning the rows of stub rollers and cradled thereby. A respective idler pulley is disposed between each two successive stub rollers along one of the longitudinal sides of the chamber, the idler pulleys lying in a further row below the row of stub rollers. An endless drive element overshoots two successive stub rollers of the section in a respective single loop and undershoots each of the pulleys in a respective single loop between each of the two successive stub rollers to reduce the required driving power.

24 Claims, 7 Drawing Sheets

GLASS-TREATING FURNACE WITH ROLLER CONVEYOR

FIELD OF THE INVENTION

Our present invention relates to a furnace of the type in which glass articles, generally flat glass articles, are subjected to controlled heating while being displaced on a roller conveyor through the elongated furnace chamber in which they are heated by radiant energy from an array of heaters located above the roller conveyor.

BACKGROUND OF THE INVENTION

In the commonly assigned U.S. Pat. No. 4,528,016 issued 9 July 1985 to Douglas M. CANFIELD, a glass furnace is described and claimed which has a roller conveyor in which conveyor rollers extend across the full width of the furnace chamber and are supported at opposite ends upon stub rollers which thereby cradle the fused silica conveyor rollers. The stub rollers, in turn, are driven by belts which alternately overshoot each stub roller and undershoot an idler roller between each pair of stub rollers along each side of the furnace chamber, the belt being driven by a motor.

In that patent, moreover, the fused rollers rest upon the belt.

In that patent and in commonly owned U.S. Pat. No. 4,601,743, issued 22 July 1986 to Douglas M. CANFIELD and in the reissue patent RE 32 497 of 8 September 1987, scanning thermographic equipment is claimed for controlling the individual heating elements of the furnace to obtain a desired heating profile.

Attention may also be directed to recently issued U.S. Pat. No. 4,725,300 of 16 February 1988 which discloses a cradled-roll conveyer in which alternating stub rollers are driven worm gearing through respective worm-gear transmissions having a common drive shaft.

Notwithstanding the rapid advances made in recent years in such glass-treating furnaces, there are a number of problems which have not been fully resolved heretofore.

For example, the drive energy required to operate the roller conveyor in all of these earlier systems is greater than is desirable.

Problems are encountered in earlier systems with respect to maintaining the fused rollers in position on the stub rollers without subjecting the fused rollers to excessive wear.

Another problem is the delivery of the driving force to the fused roller without unnecessarily constraining the latter under the high temperature conditions to which the fused roller may be subject within the furnace chamber.

By and large, in addition, the earlier furnace systems lack versatility, at least in some respects.

OBJECTS OF THE INVENTION

It is, therefore, the principal object of the present invention to provide an improved glass-treating furnace with a roller conveyor in which the drive energy can be substantially reduced.

Another object of this invention is to provide a furnace for the purposes described which overcomes drawbacks of prior art systems and is more versatile and free from many of the problems which have hitherto been encountered.

SUMMARY OF THE INVENTION

These objects and others which will become apparent hereinafter are attained, in accordance with our present invention in a glass-treating furnace which comprises:
- a housing defining an elongated furnace chamber having opposite longitudinal sides and having an inlet end and an outlet end;
- a roller conveyor extending between the inlet end and the outlet end, the roller conveyor comprising:
- a respective row of stub rollers spa<:ed apart along each longitudinal side of the chamber, the stub rollers having respective axes,
- respective conveyor rollers spanning the rows of stub rollers and respectively cradled in pairs of the stub rollers at opposite ends of each of the conveyor rollers,
- a respective idler pulley between each two successive stub rollers along one of the longitudinal sides of the chamber, the idler pulleys lying in a further row below the row of stub rollers along one of the longitudinal sides, and
- an endless drive element for driving at least a multiplicity of the conveyor rollers over at least a section of the length of the furnace, the drive element overshooting the axes of each of the two successive stub rollers of the section in a respective single loop and undershooting each of the pulleys in a respective loop between each of the two successive stub rollers, and being drivingly coupled to each of the two successive stub rollers without passing around a pulley between them;
- means for driving the element to advance a glass workpiece through the chamber; and
- an array of infrared heaters mounted in the housing above the conveyer to heat the workpiece on the conveyor rollers.

The heaters can be fused-quartz heaters, but preferably make use of a ceramic body having grooves in which a resistance heating coil is partially embedded. Except for the exposed surface of the heaters, they can be fully insulated and each heater can form a zone which is individually controlled or can be constituted from a plurality of zones each of which uses a respective coil.

The drive element of the invention can be provided on only one longitudinal side of the chamber for the row of stub rollers on this side or can be one of two such drive elements provided on opposite longitudinal sides of the drive chamber so that both rows of stub rollers are driven.

It is important to the present invention that each overshoot loop pass directly across two stub rollers before being looped around an idler pulley or, stated otherwise, that the drive element have a single loop around the drive pulleys connected to the cradle portions of the stub rollers taken in twos. We have found, that by skipping a looping around an idler pulley between the drive pulleys of the pair overshot by the belt, it is possible to obtain a 30 to 40% reduction in the horsepower required to drive the roller conveyor.

According to another feature of the invention, the drive means unidirectionally drives the conveyor rollers although it is possible in accordance with the invention to make the drive means reversible to allow the workpiece to move back and forth on the roller conveyor Another important feature of the invention is that the drive pulleys are separated from the cradle portions, i.e. the belt does not pass directly over the cradle portions. This allows the drive pulleys to be mounted on the same shaft as the respective conveyor portion to be turned away form the furnace chamber whereas the cradle portion is turned toward the furnace chamber.

According to another feature of the invention, the belt is a timing belt, i.e. is formed with cogs or teeth which engage the cogs or teeth of timing belt pulleys. The arrangement of the drive pulleys and idlers should be such that the timing belt will have at least four teeth engaged with each of the drive rollers.

According to another feature of the invention, the fused rollers are supported by tires on the stub rollers, the tires of the stub rollers which are driven having cylindrical surfaces in line contact with the respective fused rollers.

The nondriven stub rollers can also have respective tires preferably shaped so that the tires are in point contact with the cylindrical fused rollers.

The cylindrical surfaces of the tires for the drive stub rollers can result when the tires have square, rectangular or other polygonal cross sections whereas the point contact can be the consequence of using tires with round or triangular cross section.

We have found that it is important to provide the tires and the cylindrical fused rollers so that there is a friction coupling between the fused rollers which exceeds by a minimum of 20% the friction at slip. In other words the mutual coefficient of friction and the force with which the fused cylindrical rollers are coupled via the tires to the stub rollers should be such that it is a minimum of 20% in excess of the slip friction for a driving stub roller. Of course, we prefer to have a friction coupling such that the friction force is 30% or more in excess of the force at which slip can occur under normal operating conditions and loads.

According to an important feature of the invention, the roller conveyor is divided into sections along its length, each section having a separate drive motor. Control means can be provided for synchronizing the drive motors for joint operation of all of the conveyor rollers. The control means also may enable independent control of the motor for each section so that, for example, once the upstream section can accelerate a workpiece into the furnace, a downstream section can accelerate a workpiece out of the furnace and one or more intermediate sections can displace the workpiece at different rates and/or effect reciprocation of the workpiece, i.e. impart a back and forth motion thereto.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
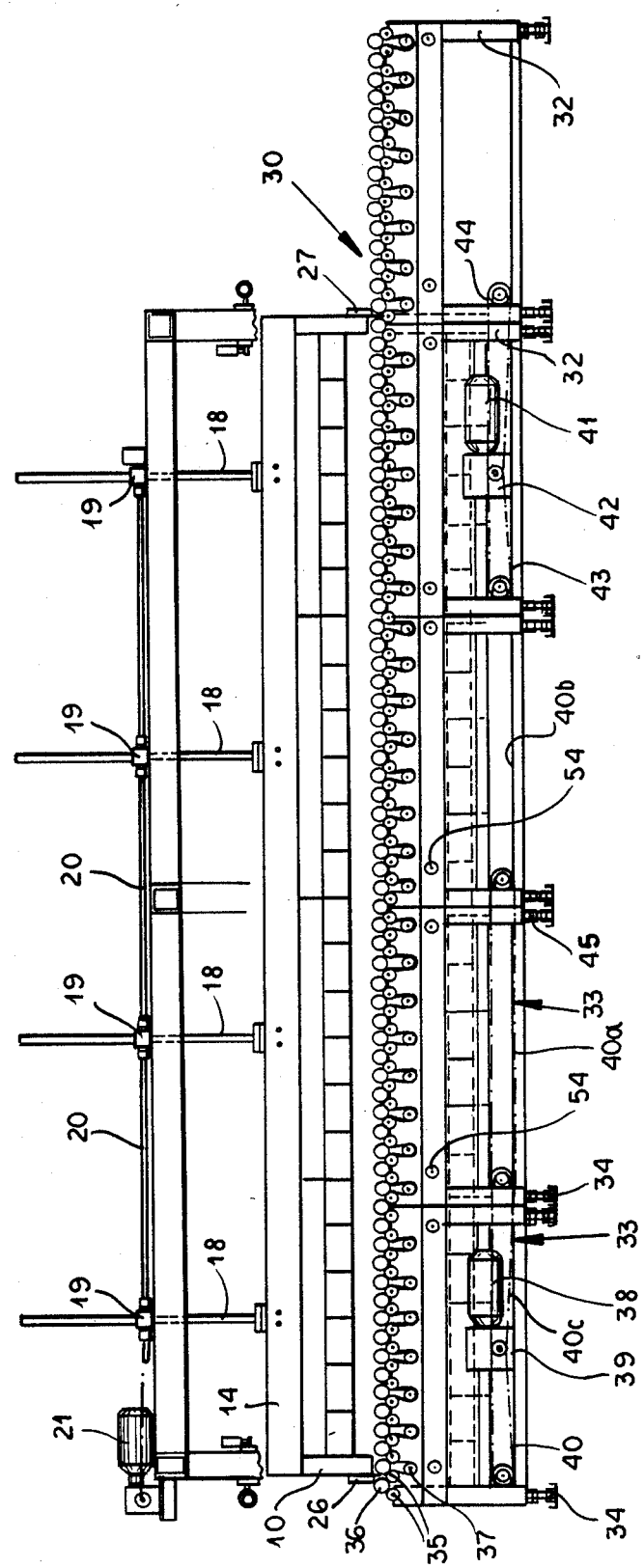
FIG. 1 is a diagrammatic side elevational view of a glass-heating furnace, according to the invention showing the arrangement of the heating elements, conveyor rolls and stub rollers, and without said walls of the furnace chamber which can flank the path of the workpieces.
Figure 2:
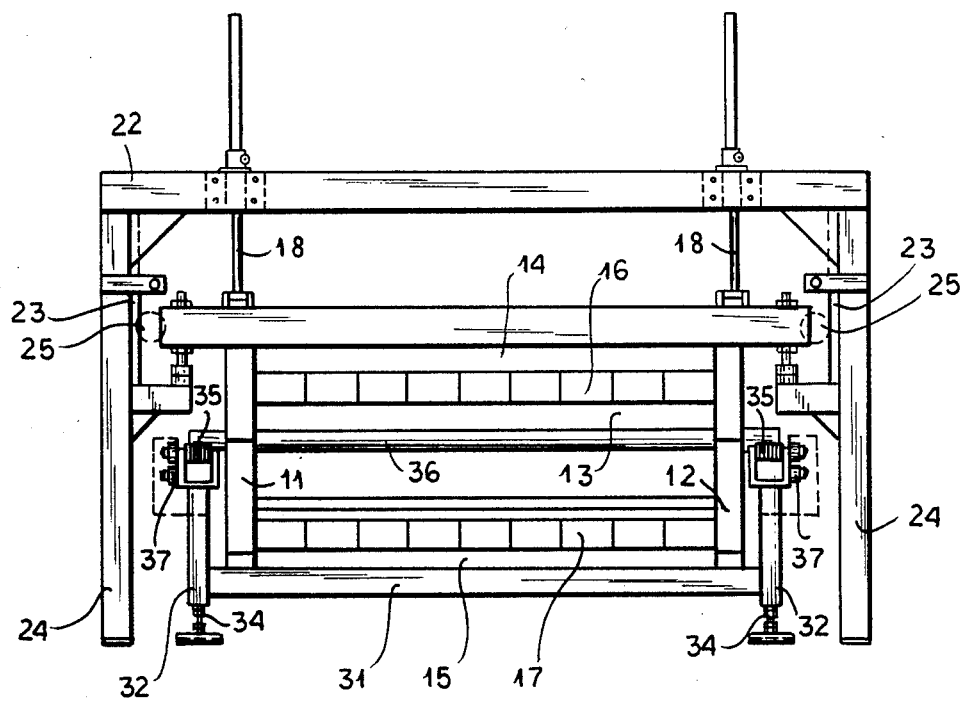
FIG. 2 is an end view of this furnace also in highly diagrammatic form.

Referring first to FIGS. 1 and 2, it can be seen that basically the furnace for the treatment of glass sheets in accordance with the invention can comprise a housing 10 with longitudinal walls 11 and 12 (FIG. 2) which are not seen in FIG. 1 or can be considered as having been broken away in this Figure.

The longitudinal walls define a furnace chamber 13 with a roof 14 and a floor 15, both the roof 14 and the floor 15 being provided with grid arrays 16 and 17 of rectangular radiant heating units such as quartz-plate heaters as described in the aforementioned commonly owned patents.

Figure 3:
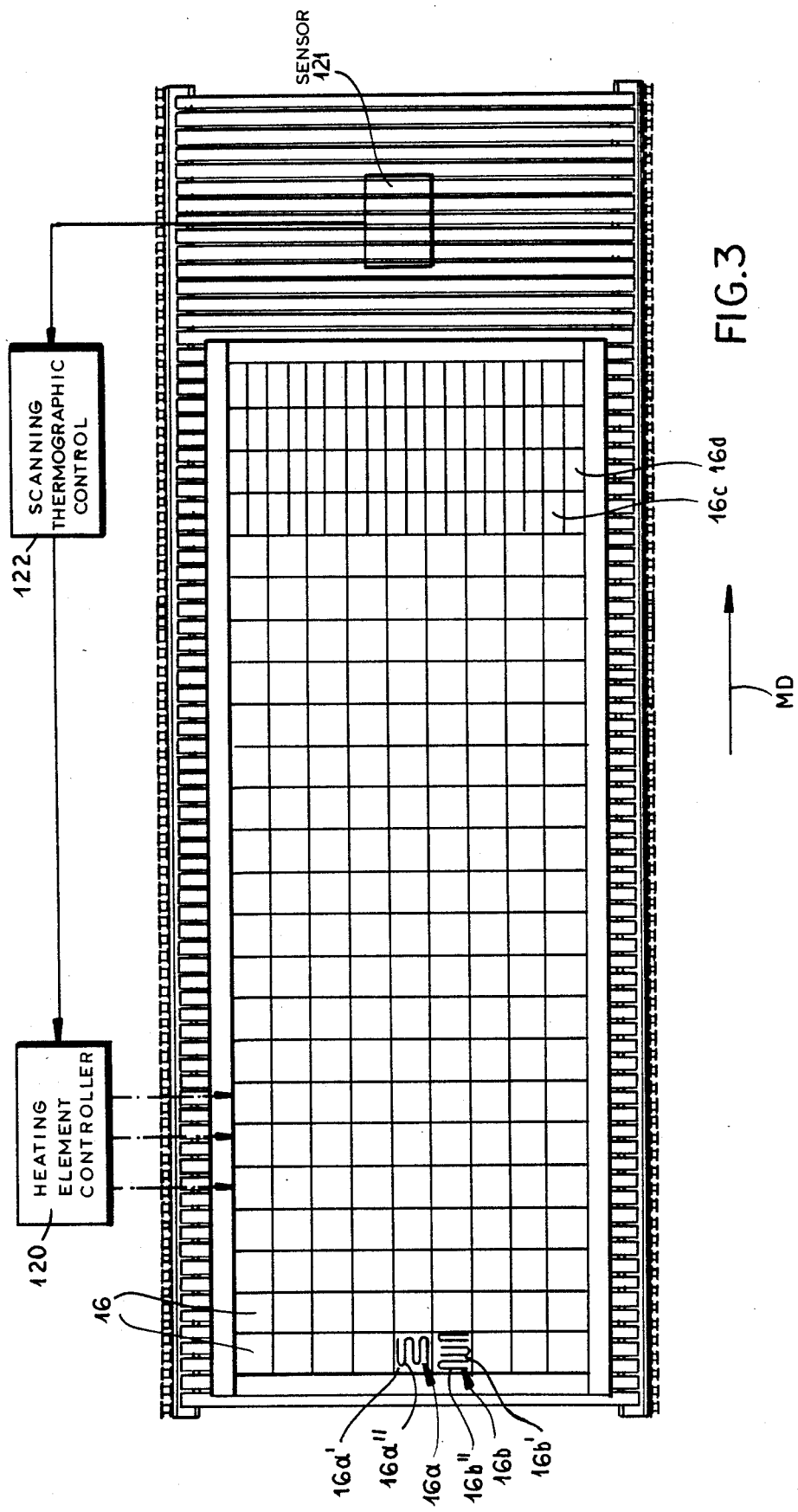
FIG. 3 is a plan view of the roller conveyor upon which the grid layout of the heating element array has been superimposed for illustration to diagram control features of the invention.

Preferably, however, as shown symbolically in FIG. 3, the individual heaters 16$a$, 16$b$, 16$c$ or 16$d$ can comprise high-temperature ceramic refractory boards or plates, formed with grooves and receiving resistances heating coils in a meandering pattern. In FIG. 3, for example, one such board is shown at 16$a$ and has its resistance heater 16$a''$ received in a groove (represented at 16$a'$) therein. A single serpentine heater is used in this construction. The heater 16$b$ is symbolically shown to have a grooved plate 16$b'$ and a plurality of heating element 16$b''$ which can be individually controlled.

As is also visible from FIG. 1, the roof 14 is suspended from rods 18 which can vertically be adjusted by individual drive mechanisms 19 coupled together by shafts 20 and provided with a common drive 21 for each of the sets of rods 18 as will be apparent from a comparison of FIGS. 1 and 2.

Thus the roof of the chamber may be raised and lowered to simultaneously raise and lower the upper array of heating units on a furnace frame generally represented at 22. Vertical guides 23 can be provided on side members 24 of this frame and the roof 14 can have rollers 25 spaced along the length of the roof at each longitudinal side thereof to guide the roof on the frame while maintaining it horizontal.

The lower set of heaters 17 can be vertically adjustable if desired as well.

It should be pointed out that the lower set or bottom heaters are masked in part by the fused cylindrical rollers upon which the glass workpieces ride through the furnace and thus primarily are provided to heat these rollers.

The upstream end of the furnace is provided with a door diagrammatically represented at 26 while the downstream end is formed with a door 27. These doors can be raised and lowered by a motor, air cylinder or salenoids not shown.

Extending substantially horizontally through the furnace is a roller conveyer generally represented at 30 and comprising a frame 31 with vertical posts 32 spaced along the length of the conveyor. The frame may be formed in sections 33, for example, each having a set of adjustable feet 34 allowing the particular frame section to be adjusted and enabling the roller conveyor to be perfectly level. A typical section of the roller conveyor is shown in greater detail in FIG. 4.

Each section of the roller conveyor comprises a multiplicity of stub rollers 35 arrayed in a respective row along each longitudinal side of the furnace chamber, preferably outwardly of the walls thereof so that each pair of stub rollers forms a cradle for a respective fused silica conveyor roller 36 extending the full width of the furnace and supported at its opposite ends on pairs of the stub rollers as will be described in greater detail in connection with FIGS. 5, 8 and 9.

Between groups of two such stub rollers on each side at which the stub rollers are driven, the respective conveyor frame sections 33 are provided with idler rollers or pulleys shown at 37 in FIGS. 1 and 2.

In the embodiment illustrated in FIG. 1, a motor 38 with a speed-reducing transmission 39 drives chains 40, 40a, 40b, 40c to propel the conveyor rollers of the three upstream sections of the conveyor seen in FIG. 1 while another motor 41 and a speed-reducing transmission 42 drives chains 43 and 44 to operate the drive belts for the two downstream sections of the roller conveyor of which the last lies outside the furnace chamber.

The frames 32 are mounted on adjustable feet 34 to allow precise alignment and leveling of the conveyor sections.

Figure 5:
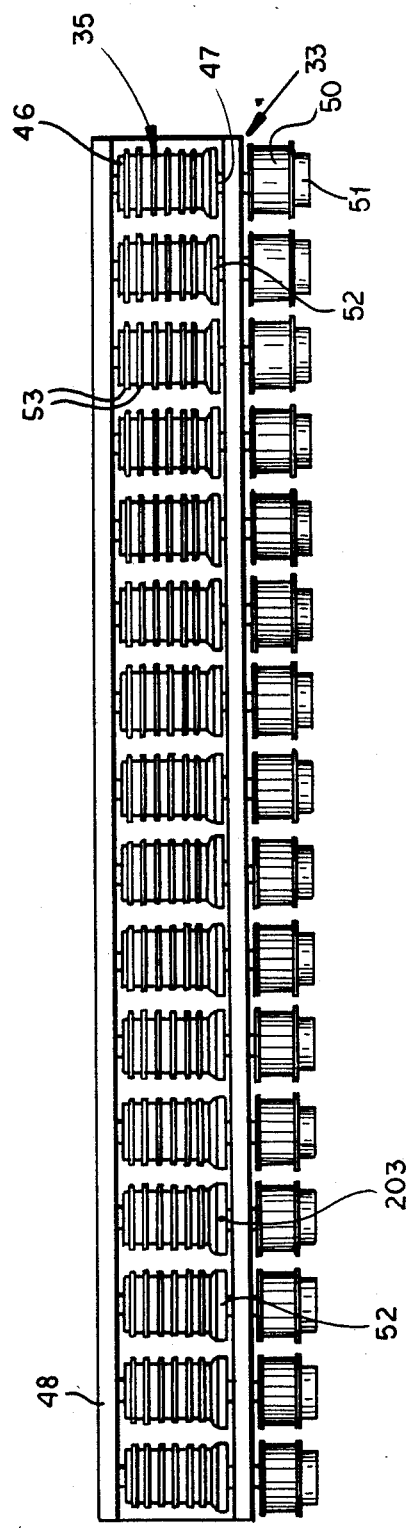
FIG. 5 is a plan view of the stub rollers of FIG. 4.

Referring now to FIG. 5, it can be seen that the stub rollers 35 can comprise, in turn, roller portions 46 mounted upon roller shafts 47 which extend through a pair of support walls 48 and 49 of the base 200 (FIG. 6) and are journaled via suitable bearings therein. On these shafts are drive pulleys 50 in the form of cogged, sprocket, chain or standard timing belt pulleys.

Each of the drive pulleys 50 has a set screw to prevent the drive pulley 50 from working off the shaft 47 and the drive pulley 50 is keyed to the stub roller shaft to ensure that the roller portion 46 will rotate therewith. The free ends of the pulleys 50 are represented at 51.

A ring 52 to be described in greater detail hereinafter, prevents movement of the conveyor roller past the end of the roller portion of the stub roller and each roller portion carries tires 53 likewise to be described in greater detail hereinafter.

Figure 6:
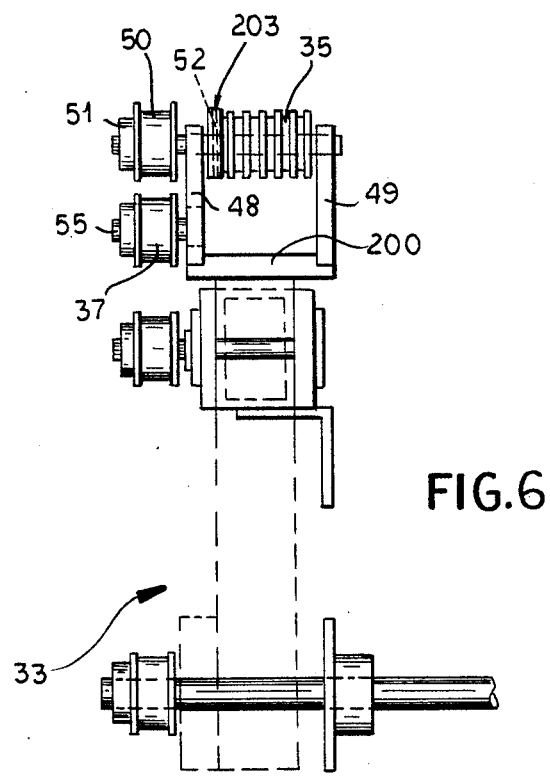
FIG. 6 is an end elevational view of the portion of the structure shown in FIG. 4.

As can be seen from FIG. 6, moreover, the removal of a pin 203 holding the ring or rub guide 52 on the shaft of the stub roller, permits withdrawal of the shaft from the plates 48 and 49 for replacement of the stub roller 35 or any of the parts of the stub roller assembly. Thus the pin 203 holds the whole stub roller assembly together.

The frame also is formed with a set of idler rollers 37 shown to be held on idler roller shafts 55 journaled on the plate 48. The idler pulleys 37 are coplanar with the drive pulleys.

Additional idler pulleys 54, may be provided as guides for the timing belt as may be required.

Figure 4:
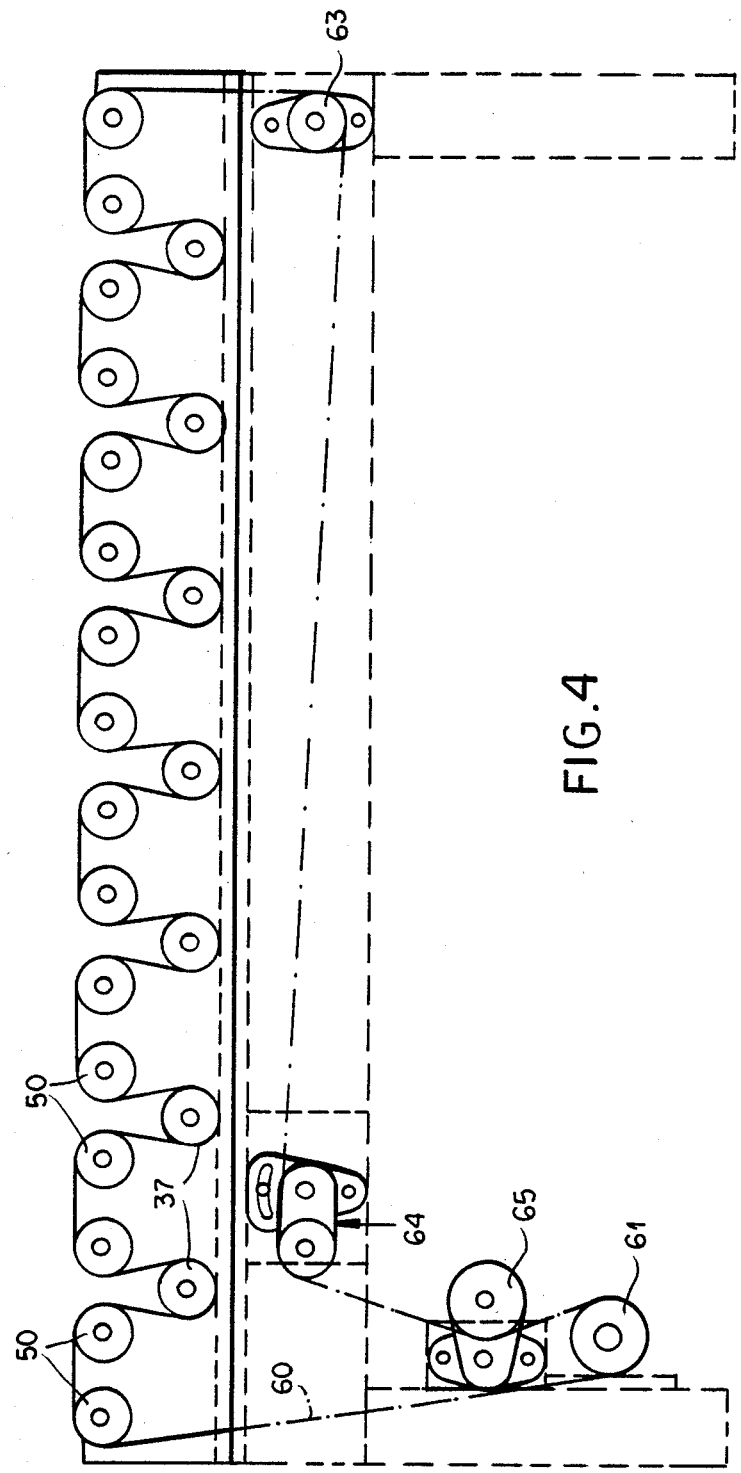
FIG. 4 is a side elevational view of the arrangement of stub rollers and idler pulleys according to the present invention for one of the sections of the furnace of FIGS. 1-3.

As can be seen from FIG. 4, the cogged, chained or toothed timing belt 60 passes from a drive pulley 61 connected to a motor over the first two drive pulleys 50 before undershooting the idler pulley 37 between the next two drive pulleys 50. The timing belt thus passes over two drive pulleys in a single loop before it undershoots an idler pulley rather than, as has been the case in prior systems, passing under an idler between successive driven stub rollers.

The belt returns via an idler 63 and over a belt tensioner 64 and around an idler 65.

As a consequence of the elimination of half of the idlers in the belt path of the present invention, we are able to achieve a reduction of 30 to 40 % in the horsepower required to drive the stub rollers.

The idlers can be positioned so that there is a minimum of four-tooth contact between the timing belt 60 and each of the drive pulleys 50 of the stub rollers, this degree of contact ensuring proper transfer of energy. The timing belt itself may be any conventional timing, toothed or cogged belt, preferably a belt provided with steel reinforcementsor steel chain.

As is also apparent from FIG. 6, through the use of the pulleys as distinct from the tire-carrying portions of the stub rollers, the drive belt and pulley arrangement is located outboard of the respective frames 48, 49, 200 to facilitate belt installation and simplifying such installation by comparison with, for example, the system described in U.S. Pat. No. 4,528,016.

FIG. 2 shows that the stub rollers on opposite longitudinal sides of the furnace can both be driven by respective belt systems. However, it is equally contemplated in accordance with the invention to drive the system on only one of the two longitudinal sides. Furthermore, in the aforementioned patent an oscillating mode of driving the roller conveyor has been described and, in accordance with the present invention, either that oscillating mode or a continuous drive mode may be used. In the latter, of course, the roller conveyor is driven unidirectionally and advances the workpiece through the furnace at a controlled rate.

In addition, the stub shafts are here shown to be driven on only one side in the best mode embodiment of the invention, although it will be apparent that each stub shaft can be driven additionally on its inboard side in the oscillating or continuous drive mode as required Indeed, it is contemplated with the present invention to drive alternating stub shafts on one or the other side or with one stub shaft driven on two sides and the next stub shaft driven on only one side or in various combinations.

Figure 7:
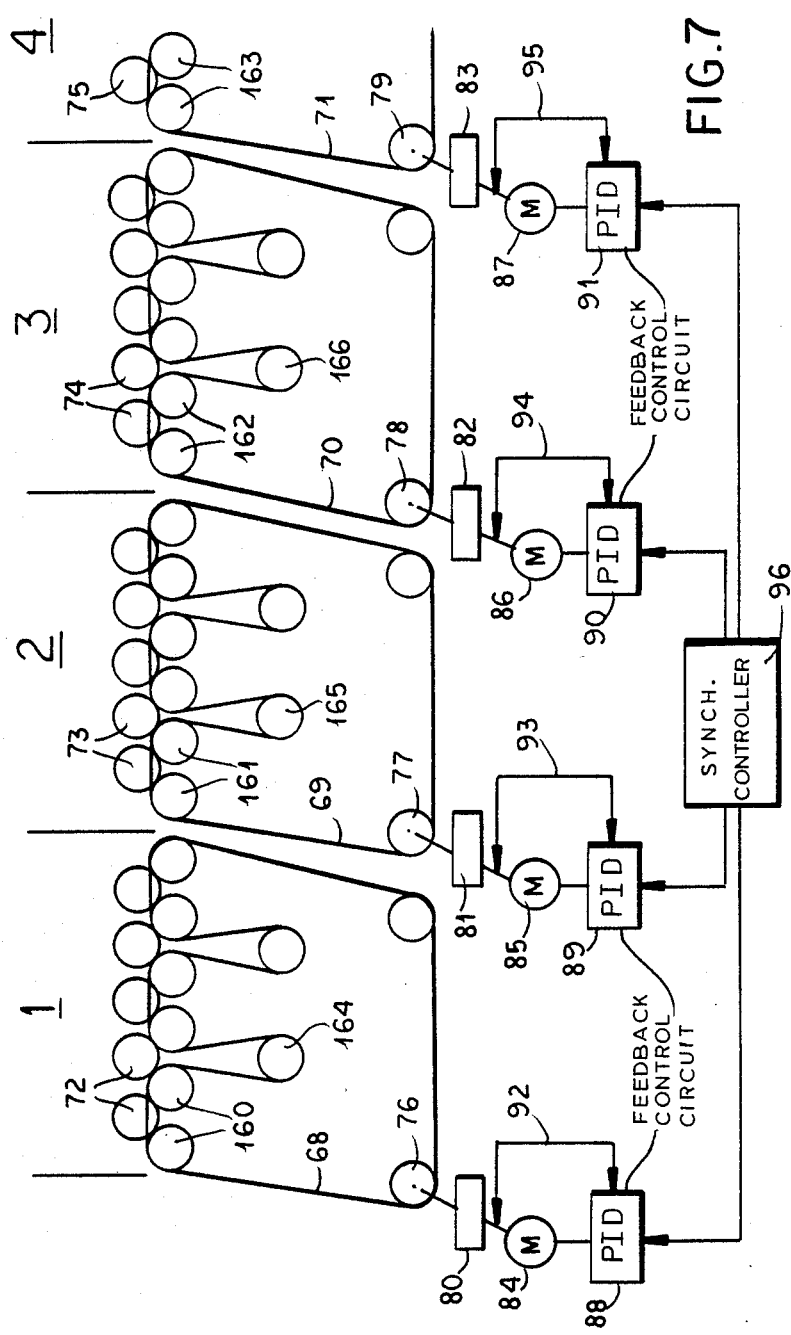
FIG. 7 is a diagram of a multisection conveyor illustrating principles of the invention.

As can be seen from FIGS. 1 and 7, the roller conveyor can be divided along its length into a number of sections which have, in FIG. 7, been illustrated diagrammatically as the sections I, II, III, IV for convenience. Indeed, in FIG. 7, the frames for each section have not been illustrated and only a limited number of stub rollers and their respective drive pulleys have been illustrated at 160, 161, 162, 163, etc. while the idlers 164, 165, 166 are shown disposed between pairs of stub rollers on each driven side of the furnace.

As is also clearly apparent from FIG. 7, each section of the roller conveyor has its own timing belt 68, 69, 70, 71 and the latter drives the respective sets of conveyor rollers 72, 73, 74 and 75 extending across the width of the conveyor and cradled on the stub roller in the manner already described. The individual timing belts 68–71 are driven by respective drive pulleys of the timing belt type shown at 76–79, respectively from speed reducing gearings 80–83 by respective electronically controlled motors 84–87 responsive to proportional-integral-differential or PID controllers 88–91 respectively. Feedback loops 92-95 are provided to monitor the speeds of the belts and to feed respective signals to the controllers and a synchronizing controller 96 can be provided for synchronizing all of the drives to achieve the desired goal of oscillating or continuous displacement of the workpiece.

In the apparatus as illustrated in FIG. 7, where the independent sections have separate drive motors, the controllers illustrated can represent digital microprocessors controls such as that marketed under the designation Fenner M-Trim, Fenner M-Drive, Fenner M-Track or similar product with each drive having a ring kit or tachometer or encoder providing a feedback signal to each Fenner. In a master/slave arrangement, as shown in FIG. 10 all of these drives can be synchronized using the PID function.

Figure 10:
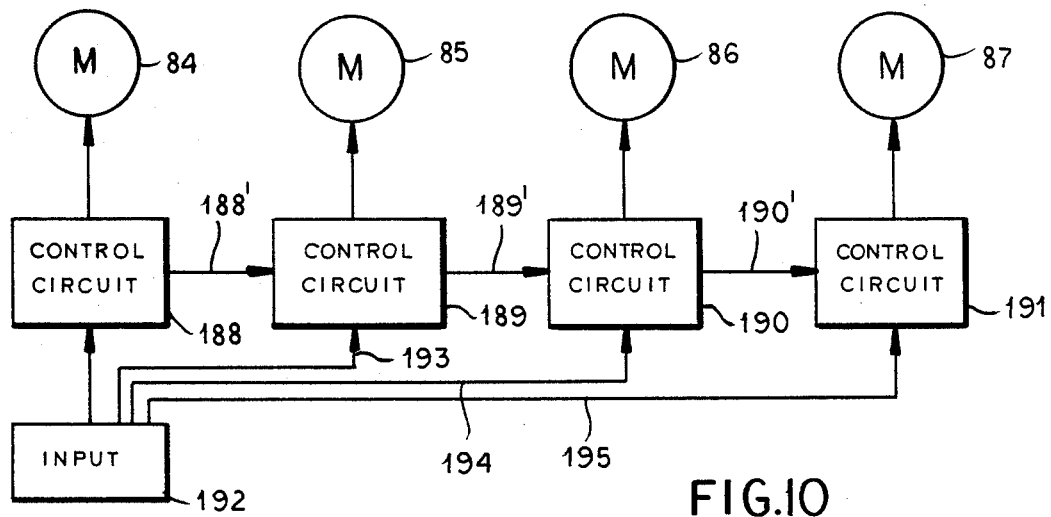
FIG. 10 is a diagram of a portion of a control system for a multisection conveyor as otherwise illustrated in FIG. 7 showing another arrangement for controlling the drive for the respective sections.

In FIG. 10 the motors 84, 85, 86 and 87 have individual controlled circuits 188, 189, 190 and 191, but the controlled circuit 188 serves as a master and the remaining controlled circuits are slaved thereto as represented by the controlled lines 188′, 189′ and 190′, respectively.

The important circuit for the master 188 is represented at 192 and also can cutoff the master slave relationship so that the individual controlled circuits can accommodate or reverse the respective motors as represented by the controlled lines 193, 194 and 195.

The controller 96 can be operated to allow the upstream and downstream roller conveyor sections to accelerate the glass into and accelerate the glass out of the otherwise continuous conveyor system or to accelerate the glass from station to station with oscillation or simply appropriate speed variation.

Figure 8:
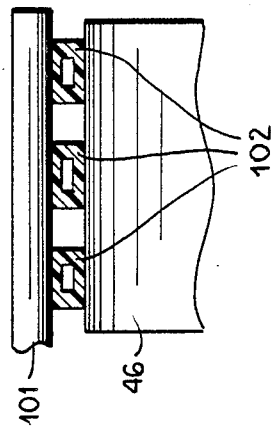
FIG. 8 is a sectional view showing tires on a driving stub roller according to the principles of this invention.
Figure 9:
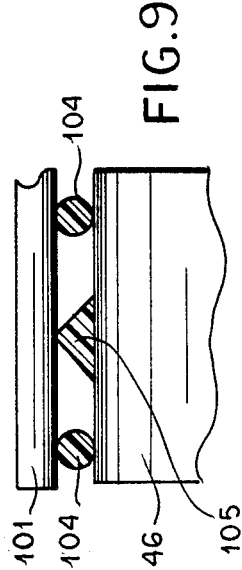
FIG. 9 is a view similar to FIG. 8 for a nondriving supporting stub roller.

Turning to FIGS. 8 and 9 it will be apparent that each roller portion 46, for example, of a driven stub roller, for effective transfer of rotation to the conveyor roller 101 cradled thereby, can have a square or other rectangular cross section as shown for the tires 102 so that the outer surface of the tires are cylindrical and substantial surface or line contact is guaranteed between the conveyor roller and the stub roller. In any event the contact is over a given length of the conveyor roller.

On the other hand, where nondriven stub rollers are used, e.g. the roller 46 shown in FIG. 9, say for supporting the opposite end of the conveyor roller 101, the tires 104 and 105 should be substantial in point contact with the conveyor roller and thus may have round or pointed cross sections as shown to give support to the roller but minimize the coupling of the conveyor rollers to the stub rollers. The friction may also be reduced at these contact points by forming the tires of a low friction material. As a consequence, some slippage can occur at these supporting stub rollers as is required because of variations in the diameters of the silica conveyor rollers.

As has been noted in connection with FIGS. 5 and 6, each stub roller is provided with a rub guide ring 52 to prevent migration of the end of the conveyor roller there past. We have found that it is important to prevent wear of the conveyor roller by such rub guides. The rub guides may then be composed of Nylatron or other lubricated synthetic-resin material.

The stub roll assembly is held together, as described, with the single roll pin 203 which, upon extraction, allows for replacement of the stub roll assembly and access to the bearings.

Finally, it can be seen from FIG. 3 that the heating elements 16 are provided in an array extending along the path of the workpiece and across the width of this path with the individual heating elements being controlled by a heating element controller 120 shown to be coupled only to several of the heating elements but, of course, connected to individually control them all.

Scanning thermographic equipment with a sensor 121 and a control system is described in U.S. Pat. No. 4,601,743 and reissue patent RE 32-497 is connected to the sensor 121 as shown at 122 to operate the heating element control 120 utilizing the principles described in these last mentioned patents. We can thus provide for multiple zone control and differential heating for thermal profile control of the product.

Differential heating can be used for differential bending of any kind of differential heating profile can be established in accordance with the invention.

We claim:

1. A furnace for the heat treating of glass, comprising:
   a housing defining an elongated furnace chamber having opposite longitudinal sides and having an inlet end and an outlet end;
   a roller conveyor extending between said inlet end and said outlet end, said roller conveyor comprising:
   a respective row of stub rollers spaced apart along each longitudinal side of said chamber, said stub rollers having respective axes,
   respective conveyor rollers spanning said rows of stub rollers and respectively cradled in pairs of said stub rollers at opposite ends of each of said conveyor rollers,
   idler pulleys alternating with idler-pulley-free spaces between each two successive stub rollers along one of said longitudinal sides of said chamber, said idler pulleys lying in a further row below said row of stub rollers along said one of said longitudinal sides, and
   an endless drive element for driving at least a multiplicity of said conveyor rollers over at least a section of the length of said chamber, said rive element overshooting the axes of each of said two successive stub rollers of said section in a respective single loop across each of said idler-pulley-free spaces and undershooting of said pulleys in a respective loop between each of said two successive stub rollers having an idler-pulley between them, and being drivingly coupled to each of said two successive stub rollers having an idler-pulley-free space between them;
   means for driving said element to advance a glass workpiece through said chamber; and
   an array of infrared heaters mounted in said housing above said conveyor to heat said workpiece on said conveyor rollers.

2. The furnace for the heat treating of glass as defined in claim 1 wherein a said drive element for said conveyor rollers is provided on only one of said longitudinal sides of said chamber.

3. The furnace for the heat treating of glass as defined in claim 1 wherein a respective row of said pulleys is provided along each of said longitudinal sides of said chamber and a respective said drive element is looped about two of said stub rollers and then undershoots a respective one of said pulleys on each of said longitudinal sides of said chamber.

4. The furnace for the heat treating of glass as defined in claim 1 wherein said means for driving is a continuous unidirectional drive.

5. The furnace for the heat treating of glass as defined in claim 1 wherein said means for driving is an oscillating drive for moving said workpiece back and forth on said roller conveyor.

6. The furnace for the heat treating of glass as defined in claim 1 wherein each of said stub rollers is formed with a cradle portion supporting a respective one of said conveyor rollers and a drive pulley engaged by said drive element and axially aligned with and operatively connected to a respective cradle portion.

7. The furnace for the treatment of glass as defined in claim 6 wherein said drive element is an endless element comprised of flat belt or a V-belt and each of said drive pulleys is a flat belt pulley or V-belt pulley, respectively.

8. The furnace for the heat treating of glass as defined in claim 6 wherein said drive element is a chain and each of said drive pulleys is a sprocket wheel.

9. The furnace for the heat treating of glass as defined in claim 6 wherein said drive element is a cogged timing belt and each of said drive pulleys is a timing-belt pulley engaging the teeth of said timing belt.

10. The furnace for the heat treating of glass as defined in claim 9 wherein each of said drive pulleys is engaged with at least four-tooth contact by said timing belt.

11. The furnace for the heat treating of glass as defined in claim 6 wherein the cradle portion of each of the stub rollers on said one longitudinal side of said chamber is provided with at least one tire frictionally engaging and supporting a conveyor roller cradled thereby, said tires having cylindrical surfaces in contact with the respective conveyor roller.

12. The furnace for the heat treating of glass as defined in claim 11 wherein said tires have substrate rectangular square cross sections.

13. The furnace for the heat treating of glass as defined in claim 11 wherein the stub rollers on the other longitudinal side of said chamber are shaped to have substantially point contact with the respective conveyor rollers.

14. The furnace for the heat treating of glass as defined in claim 13 wherein the tires of the stub rollers on said other longitudinal side of said chamber have round cross sections.

15. The furnace for the heat treating of glass as defined in claim 13 wherein the tires of the stub rollers on said other longitudinal side of said chamber have pointed cross sections.

16. The furnace for the heat treating of glass as defined in claim 1 wherein said drive element drives substantially all of the stub rollers along said one of said longitudinal sides of said chamber.

17. The furnace for the heat treating of glass as defined in claim 1 wherein said roller conveyor is formed with a plurality of roller-conveyor sections each driven by a respective one of said drive elements.

18. The furnace for the heat treating of glass as defined in claim 17 wherein said drive elements are provided with a common drive motor.

19. The furnace for the heat treating of glass as defined in claim 17 wherein said drive elements are provided with respective drive motors.

20. The furnace for the heat treating of glass as defined in claim 19, further comprising synchronizing circuit means for synchronizing said drive motors with one another.

21. The furnace for the heat treating of glass as defined in claim 20, further comprising means for decoupling said drive motors from one another and operating selected ones of said drive motors to selectively accelerate and decelerate said workpiece at selected sections relative to others of said sections.

22. The furnace for the heat treating of glass as defined in claim 6 wherein each said drive pulley and the respective cradle portion form an assembly which comprises the drive pulley, the cradle portion and a rub guide ring on a stub roller shaft mounted on a support by said shaft, a pin holding said assembly together and, upon withdrawal enabling separation of said assembly and removal of said assembly from said support.

23. The furnace for the heat treating of glass as defined in claim 1, further comprising means for controlling heaters of said array selectively to vary a heating profile across said workpiece.

24. The furnace for the heat treating of glass as defined in claim 23 wherein said means for controlling includes scanning thermographic means for scanning said workpiece across the latter for controlling the heaters of said array.

* * * * *